United States Patent Office 3,645,993
Patented Feb. 29, 1972

3,645,993
INTERPOLYMERIZATION OF A MIXTURE OF MONOOLEFINS AND A POLYENE IN THE PRESENCE OF A BASE AND A HALOGENATED COMPOUND
Ronald H. Sunseri, Baton Rouge, La., assignor to Copolymer Rubber & Chemical Coorporation
No Drawing. Continuation-in-part of application Ser. No. 701,852, Jan. 31, 1968, which is a continuation-in-part of application Ser. No. 622,888, Mar. 4, 1967. This application June 16, 1969, Ser. No. 833,695
Int. Cl. C08f 15/40
U.S. Cl. 260—80.78                                    35 Claims

ABSTRACT OF THE DISCLOSURE

Sulfur vulcanizable elastomers which are substantially free of gel are prepared in solution in an organic solvent from a monomeric mixture including ethylene, an alpha-monoolefin containing 3–16 carbon atoms and a polyunsaturated monomer in the presence of a Ziegler-type polymerization catalyst, and a synergistic combination of certain bases and a halogenated organic compound.

This application is a continuation-in-part of my co-pending application Ser. No. 701,852, filed Jan. 31, 1968, and entitled "Interpolymerization of a Mixture of Monoolefins and a Polyene in the Presence of a Base and a Halogenated Compound," which in turn is a continuation-in-part of my co-pending application Ser. No. 622,888, filed Mar. 4, 1967, and entitled "Interpolymerization of a Mixture of Monoolefins and a Polyene in the Presence of an Amine and a Halogenated Compound."

This invention broadly relates to a novel process for preparing sulfur vulcanizable elastomers by interpolymerizing a monomeric mixture containing alpha-monoolefins and at least one ethylenically unsaturated monomer which has a plurality of carbon-to-carbon double bonds. In one of its more specific aspects, the invention is concerned with the polymerization of the foregoing monomers in solution in an organic solvent and in the presence of a Ziegler-type catalyst and a synergistic combination of a base and a halogenated organic compound.

Elastomers prepared by interpolymerizing a monomeric mixture composed of ethylene and at least one higher alpha-monoolefin in solution in an organic solvent and in the presence of a Ziegler catalyst are well known. The resulting elastomers have no ethylenic unsaturation, and thus they are not sulfur vulcanizable. As a result, other types of vulcanizing or curing agents must be used such as the organic peroxides.

Efforts have been made heretofore to provide ethylenic unsaturation in the above-mentioned class of elastomers by including a reactive monomeric polyene in the mixture of alpha-monoolefins to be polymerized. The interpolymer thus produced contains residual ethylenic unsaturation, and it may be cured with sulfur following prior art practices. When polymerizing monomeric mixtures including a polyene in accordance with prior art practices, often gel or insoluble polymer is formed, or other undesirable types of polymer which give rise to poor physical properties. Also, the internal surfaces of the reactor that is used in preparing the polymer often are fouled rapidly with deposits and the polymerization line must be shut down periodically for cleaning. This is especially true when polyene monomers which have highly reactive unsaturation are present as third monomers in the polymerization mixture. As a result, the art has long sought an entirely satisfactory process for suppressing the above types of undesirable polymerization, whereby very reactive polyenes may be used as third monomers to achieve residual unsaturation without the usual difficulties and disadvantages.

It has been proposed heretofore to employ certain amines as suppressors in the above-polymerizations for the purpose of reducing gel formation and other undesirable types of polymerization. While the amines are very effective for this purpose, they have disadvantages which are overcome in accordance with the invention. For instance, the catalyst mileage, i.e., the amount of polymer which is produced per unit of catalyst, is low and this contributes substantially to the overall cost of manufacture. It would be desirable to provide a promoter for use in combination with the amines as the resulting synergistic combination would be capable of suppressing undesirable polymerization and increasing the catalyst mileage very markedly. However, an entirely satisfactory synergistic combination was not available to the art prior to the present invention.

It is an object of the present invention to provide a novel process for preparing sulfur vulcanizable elastomers which are substantially free of gel from a monomeric mixture including ethylene, at least one alpha-monoolefin containing 3–16 carbon atoms, and at least one ethylenically unsaturated monomer having a plurality of carbon-to-carbon double bonds.

It is a further object to provide a novel process for polymerizing the foregoing monomeric mixtures in the presence of a synergistic combination of a base and a halogenated organic compound.

It is still a further object to provide a novel process for polymerizing the foregoing monomeric mixtures in the presence of a Ziegler-type polymerization catalyst and a synergistic combination of certain bases which suppress undesirable polymerization and a promoter which is a chlorinated organic compound.

Still other objects and advantages of the invention will be apparent to those skilled in the art upon reference to the following detailed description and the examples.

In accordance with the present invention, it has been discovered that sulfur vulcanizable elastomers having improved characteristics may be prepared by interpolymerizing a monomeric mixture containing ethylene, at least one alpha-monoolefin containing 3–16 and preferably 3–10 carbon atoms, and at least one monomer containing a plurality of carbon-to-carbon double bonds in solution in an organic polymerization solvent, and in the presence of a Ziegler-type polymerization catalyst and a synergistic combination of certain bases and halogenated organic compounds. The resulting elastomers are soluble in the polymerization solvent and are free of deleterious gel and other undesirable forms of polymerization. In addition, the molecular weight of the polymer is exceptionally uniform as substantially no low molecular weight polymer or extractable polymeric oils are produced. The polymer also contains much less catalyst residue.

Surprisingly, the catalyst mileage is increased markedly in the presence of the synergistic combination of the base and the halogenated organic compound. It is possible to reduce the catalyst requirements by 50–60% or more, and thus the catalyst costs are much lower when practicing the process of the invention.

A number of bases which are soluble in the polymerization solvent are known and may be used as the suppressant component of the synergistic combination in practicing the invention. Examples include ammonia, aniline, pyridine, cyclohexylamine, hydrazine, quinoline, isoquinoline, alkyl, cycloalkyl and aryl substituted pyridines, anilines which have only one hydrogen atom attached to the nitrogen atom, hydrazines, hydroxylamines and O-ethers thereof, quinolines and isoquinolines, wherein the alkyl groups contain about 1–8 carbon atoms, the cycloalkyl groups contain about 4–12 carbon atoms and the aryl groups contain about 6–12 carbon atoms, and amines of the general formula

wherein R is hydrogen, and the two R' groups are selected individually from the group consisting of hydrogen, alkyl, halogenoalkyl, alkyl and aminoalkyl groups containing about 1–8 carbon atoms, cycloalkyl, aminocycloalkyl and halogenocycloalkyl groups containing about 4–12 carbon atoms, aryl, aminoaryl and halogenoaryl groups containing about 6–12 carbon atoms, and monovalent cyclic or bicyclic radicals containing 4–12 carbon atoms wherein the two R' groups are joined through a carbon, nitrogen or oxygen atom to form a heterocyclic ring, and not more than one R' is hydrogen. It is understood that the two R' groups need not be the same, as one R' may be an alkyl group, the second R' a cycloalkyl or aryl group, etc. Specific examples of primary and secondary amines including polyamines are given in the tables appearing on pages 616–628 and in other portions of the text "Elementary Practical Organic Chemistry, Part II, Qualitative Organic Analysis," Arthur I. Vogel, Longmans, Green and Company, New York (1957), the teachings of which are incorporated herein by reference. Examples of polyamines include propylene diamine, diethylene triamine, etc. Exampels of hydroxylamines include hydroxyl amine and monomethyl, dimethyl, monoethyl and diethyl hydroxylamines. The O-ethers of the above hydroxylamines may be used, wherein the alcoholic residue of the ether group is a monovalent hydrocarbon radical such as an alkyl group containing 1–5 carbon atoms.

Nuclearly substituted aniles and pyridines may be employed and the ring substituents may be alkyl groups containing 1–8 and preferably 1–4 carbon atoms. Nuclearly halogen-substituted anilines and pyridines also may be employed. Specific examples of such anilines and pyridines include the isomeric toluidines, the ring halogenated anilines and pyridines, picolines, lutidines, collidine, and N-monoalkyl anilines wherein the alkyl group contains 1–5 carbon atoms.

Of the foregoing bases, ammonia, aniline and pyridine are much preferred. Ammonia and aniline are unique and produce outstanding results as they increase the amount of polymer produced per unit weight of catalyst.

The amount of the base to be employed may vary over wide ranges. It is only necessary that the base be added to the hydrocarbon polymerization solvent in an amount to control gel formation and other undesirable polymerization, and amounts in excess of this are not needed and should be avoided for better results. In most instances, the base should be dissolved in the hydrocarbon polymerization solvent in an amount of about 0.1–10 millimoles per liter, and preferably in an amount of about 0.1–4 millimoles per liter with best results being secured in an amount of 1.5 millimoles per liter of solvent. Better results are usually obtained when the polymerization solvent contains about 0.5–2 millimoles of dissolved base per liter.

The halogenated organic compound to be employed as a component of the synergistic combination should have the following general formula:

wherein $R_1$ is selected from the group consisting of the completely halogenated derivatives of alkyl and alkenyl groups having 1–20 carbon atoms and preferably 1–8 carbon atoms, and A is selected from the group consisting of:

(1) Alkyl groups, alkenyl groups and carbocyclic groups having 1–20 carbon atoms and preferably 1–8 carbon atoms, and the halogenated derivatives thereof,
(2) Aryl groups having 6–20 carbon atoms and preferably 6–10 carbon atoms, and the halogenated derivatives thereof,
(3) Aralkyl groups having 7–25 carbon atoms and preferably 7–12 carbon atoms, and the halogenated derivatives thereof,
(4) Oxyalkyl and oxalkenyl groups of the general formula —$OR_2$, wherein $R_2$ is an alkyl or alkenyl group containing 1–20 and preferably 1–8 carbon atoms, and the halogenated derivatives thereof,
(5) Halogen, and
(6) A group having the general formula

wherein $R_3$ and $R_4$ are selected from the group consisting of
 (a) Hydrogen,
 (b) Alkyl and alkenyl groups having 1–20 carbon atoms and preferably 1–8 carbon atoms, and the halogenated derivatives thereof,
 (c) Aryl groups having 6–20 carbon atoms and preferably 6–10 carbon atoms, and the halogenated derivatives thereof, and
 (d) Aralkyl groups having 7–25 carbon atoms and preferably 7–12 carbon atoms, and the halogenated derivatives thereof.

The halogen content of the halogenated derivatives may include fluorine, chlorine, bromine and iodine, but it is preferably chlorine. Specific examples of suitable halogenated compounds include hexachloroacetone, perchlorocrotonyl chloride, alkyl perchlorocrotonates wherein the alkyl group contains 1–8 carbon atoms and especially ethyl, propyl and/or butyl perchlorocrotonate, trichloroacetanilide, hexachloropropene, trichloroacetophenone, and the corresponding fluorine, bromine and iodine derivatives.

The above mentioned halogenated compounds may be present in the polymerization mixture in an amount of about 1–30 mols and preferably 2–10 mols per mol of vanadium or other heavy catalyst metal in the catalyst with optimum results being secured with 7 mols per mol of vanadium. Much larger amounts may be employed when desired as the upper limit is largely economic in nature. The halogenated compound may be dissolved in the polymerization solvent and fed into the reactor as a separate stream.

The general conditions usually employed in the prior art for the interpolymerization of the reactants to produce sulfur vulcanizable elastomers may be used, with the exception of carrying out the interpolymerization in the presence of the base and the halogenated organic compound. The specific monomers and ratios of monomers to be polymerized need not differ from those used in the prior art for preparing elastomers. In many instances, it is preferred that the elastomers be prepared from a monomeric mixture containing ethylene, propylene and a polyene. Halogen substituted polyenes and especially chlorine substitute polyenes, or substituted polyenes containing other types of substituents which do not adversely affect the polymerization, may be present in the monomeric mixture to be polymerized. Thus, one or more suitable substituted or unsubstituted monomers in general which contain a plurality of carbon-to-carbon double bonds may be interpolymerized with a mixture of alpha monoolefins to produce elastomers. Examples of halogenated polyunsaturated monomers are disclosed in U.S. Pats. Nos. 3,220,988 and 3,222,330.

The elastomer may contain chemically bound therein molar ratios of ethylene to propylene varying between 90:10 and 10:90, and preferably between 70:30 and 55:45. The polyene or substituted polyene may be chemically bound therein to replace the ethylene or propylene in an amount of 0.1–10 mol percent, and preferably 0.3–1 mol percent, or in an amount to provide an actual or calculated unsaturation level of not less than about 2 double bonds per 1000 carbon atoms in the polymer chain; however, much higher actual unsaturation levels are possible such as for example, 5, 10, 20, 25, 30, 50 or 100 double bonds per 1000 carbon atoms in the polymer. The specific unsaturation level selected in a given instance will vary depending upon the properties which are desired in the elastomer, as is well recognized in the art. The invention is especially useful when preparing polymers containing 2–30, and preferably 2.5–15, double bonds per 1000 carbon atoms.

In instances where it is desired to prepare a tetrapolymer, or a polymer containing five or more different monomers, then one or more alpha-monoolefins containing 4–16 and preferably 4–10 carbon atoms should be substituted for an equal molar quantity of bound propylene in the above-mentioned polymer composition. For instance, the preferred range of the fourth monomer in tetrapolymers will usually be about 5–20 mol percent, but smaller amounts may be present such as 1, 2, 3 or 4 mol percent.

The polymerization solvent may be any suitable inert organic solvent which is liquid under the reaction conditions, and it may be a prior art solvent for solution polymerization of monoolefins in the presence of Ziegler-type catalysts. Examples of satisfactory hydrocarbon solvents include straight chain paraffins containing 5–8 carbon atoms, of which hexane often gives the best results; aromatic hydrocarbons and especially those containing a single benzene nucleus such as benzene, toluene, etc.; and saturated cyclic hydrocarbons which have boiling ranges approximating those for the straight chain paraffin hydrocarbons and aromatic hydrocarbons discussed above, and especially saturated cyclic hydrocarbons containing 5 or 6 carbon atoms in the ring. The solvent selected may be a mixture of one or more of the foregoing hydrocarbons, such as a mixture of aliphatic and naphthenic hydrocarbons isomers having approximately the same boiling range as normal hexane. It is necessary that the solvent be dry and free of substances which will interfere with the Ziegler catalyst to be used in the polymerization step.

Ziegler catalysts in accordance with the prior art may be used. In general, any suitable prior art Ziegler-type catalyst may be used which is known to produce a satisfactory elastomer. Ziegler catalysts are disclosed in a large number of issued patents, such as U.S. Pats. Nos. 2,933,480, 3,093,620, 3,093,621, 3,211,709 and 3,113,115. Examples of Ziegler catalysts include metal organic coordination catalysts prepared by contacting a compound of a heavy catalyst metal of Groups IV$b$, V$b$, VI$b$ and VII$b$ of the Mendeléeff periodic chart of the elements, as typified by titanium, vanadium and chromium halides with an organometallic compound of a metal of Groups I, II or III of the Mendeléeff periodic chart which contain at least one carbon-metal bond, as typified by trialkyl aluminum and alkyl aluminum halides wherein the alkyl groups contain 1–20 and preferably 1–4 carbon atoms. The term Ziegler catalyst as used herein is intended to embrace catalysts of the foregoing types, some of which are aften referred to as Ziegler-Natta or low pressure polymerization catalysts for alpha monoolefins.

The preferred Ziegler catalyst for many polymerizations is prepared from a vanadium compound and an alkyl aluminum halide. Examples of suitable vanadium compounds include vanadium trichloride, vanadium tetrachloride, vanadium oxychloride, vanadium acetylacetonate, etc. Activators which are especially preferred include alkyl aluminum chlorides of the general formulae $R_1AlCl_2$ and $R_2AlCl$, and the corresponding sesquichlorides of the general formula $R_3Al_2Cl_3$, wherein R is a methyl, ethyl, propyl, butyl or isobutyl radical. In the catalytic system, the aluminum to vanadium mol ratio of the aluminum and vanadium compounds may be within the range of 5/1 to 200/1 and preferably within the range of 15/1 to 60/1, with best results being secured in a mol ratio of 40 aluminum to 1 vanadium. These same ratios apply with respect to the corresponding compounds of heavy metals of the Groups IV$a$, V$a$, VI$a$ and VII$a$ for the vanadium compound and the organo metallic compounds of Groups I, II or III for the aluminum compound. A catalyst prepared from alkyl aluminum sesquichloride, such as the methyl or ethyl aluminum sesquichloride and vanadium oxychloride is especially preferred and, when using this catalyst, the preferred ratio of catalyst components is usually 1 mol vanadium oxychloride for each 5–200 mols of aluminum and, more preferably, for each 15–60 mols of aluminum, with 40 mols of the aluminum per mol of vanadium giving best results.

The polymerization is preferably carried out on a continuous basis in a dry prior art reaction vessel closed to the outside atmosphere, which is provided with an agitator, reactor cooling means, and conduit means for continuously supplying the ingredients of the reaction mixture including monomers, catalyst, the base and halogenated organic compound of the invention and conduit means for continuously withdrawing the solution of elastomer. The polymerization is carried out in liquid phase in the organic solvent in the presence of the Ziegler catalyst and the base and halogenated compound described herein. The solution of elastomer in the polymerization solvent is withdrawn continuously from the reaction vessel, the catalyst is killed by addition of a catalyst deactivator such as methanol or water, and the organic solvent is removed. The solvent may be removed by injecting the solution below the liquid level of a body of boiling water maintained in a vessel to which steam is supplied. The resulting polymer crumb is removed as a slurry from the vessel, and the polymerization solvent is withdrawn overhead as a vapor. The polymer crumb may be stripped free of traces of solvent and washed free of catalyst residues, followed by separating water from the crumb by means of a shaker screen or other device, and drying of the crumb by means of a prior art extrusion dryer or apron dryer. The dried crumb is then ready for bailing in accordance with prior art practice.

The polyene or other ethylenically unsaturated compound containing a plurality of carbon-to-carbon double bonds may be selected from those disclosed in the prior art for use as third monomers in the preparation of ethylene-propylene-polyene terpolymers, including open chain polyunsaturated hydrocarbons containing 4–20 carbon atoms such as 1,4-hexadiene, monocyclic polyenes, and polycyclic polyenes. The polyunsaturated bridged-ring hydrocarbons or halogenated bridged-ring hydrocarbons are usually preferred. Examples of the bridged-ring hydrocarbons include the polyunsaturated derivatives of bicyclo-(2,2,1)heptane wherein at least one double bond is present in one of the bridged rings, such as dicyclopentadiene, bicyclo(2,2,1)hepta-2,5-diene, the alkylidene norbornenes, and especially the 5-alkylidene-2-norbornenes wherein the alkylidene group contains 1–20 carbon atoms and preferably 1–8 carbon atoms, the alkenyl norbornenes, and especially the 5-alkenyl-2-norbornenes wherein the alkenyl group contains about 3–20 carbon atoms and preferably 3–10 carbon atoms. Other bridged-ring hydrocarbons include polyunsaturated derivatives of bicyclo(2,2,2)octane as represented by bicyclo(2,2,2)octa-2,5-diene, polyunsaturated derivatives of bicyclo(3,2,1)octane, polyunsaturated derivatives of bicyclo(3,3,1)nonane, and polyunsaturated derivatives of bicyclo(3,2,2)nonane. At least one double bond is present in a bridged ring of the above compounds, and at least one other double bond is present in a bridged ring or in a side chain. Further examples of polyunsaturated bridged-ring hydrocarbons and their use in the preparation of prior art elastomers are found in U.S. Pats. Nos. 2,933,480, 3,093,620, 3,093,621 and 3,211,709, the disclosures of which are incorporated herein by reference.

The elastomers which are especially preferred contain chemically bound therein molar ratios of ethylene to propylene varying between 70:30 and 55:45. Specific examples of preferred bridged-ring compounds include 5-methylene-2-norbornene, 5-ethylidene-2-norbornene, 5-n-propylidene-2-norbornene, 5-isopropylidene-2-norbornene, 5-n-butylidene-2-norbornene, 5-isobutylidene-2-norbornene, dicyclopentadiene, the methyl butenyl norbornenes such as 5-(2-methyl-2-butenyl)-2-norbornene or 5-(3-methyl-2-butenyl)-norbornene, and 5 - (3,5-dimethyl-4-hexenyl)-2-norbornene. The elastomer prepared from 5-ethylidene-2-norbornene is much preferred as it has outstanding properties and produces many unusual and unexpected results. As a result, this elastomer is in a class by itself.

The process of the present invention is especially useful in the preparation of sulfur-curable elastomers from monomeric mixtures including certain polyunsaturated monomers which tend to cause the formation of gel and insoluble polymer, and the fouling of the internal surfaces of the reactor and associated equipment. Examples of such monomers include the bridged-ring polyenes mentioned above, and especially the alkylidene norbornenes. Diolefins such as 5-methylene-2-norbornene, 5-ethylidene-2-norbornene, dicyclopentadiene, and polyenes in general which have strained or highly active unsaturation, have a very marked tendency to cause gel and undesirable polymerization. Thus the invention is most useful when one of these monomers is present as the polyene.

The base and halogenated organic compound are preferably added to the polymerization mixture on a continuous basis. For instance, they may be dissolved in separate portions of the polymerization solvent, and fed to the reactor continuously in separate streams.

The foregoing detailed description and the following specific examples are for purposes of illustration only, and are not intended as being limiting to the spirit or scope of the appended claims.

EXAMPLE I

This example illustrates a series of runs for the preparation of a terpolymer from a monomeric mixture composed of ethylene, propylene and 5-ethylidene-2-norbornene, in the presence of a suppressor, or various combination of promoters and suppressors.

The reaction vessel was a one-half gallon Sutherland reactor equipped with a high speed, heavy-duty air driven motor, cooling coils, a thermometer, a temperature regulator, a pressure regulator, an injection port, and other openings where monomers, catalyst, and solvent were fed to the reactor. A tube dipping to the bottom of the reactor was present for the removal of the cement, which was produced on a continuous basis. A vapor phase vent was provided to bleed off 15 percent of the gaseous monomer feed to prevent inert gas buildup.

The clean reactor was assembled, rinsed with dry hexane and purged overnight with dry nitrogen. The reactor bowl was heated the next morning with a flameless blowtorch, and hot water was run through the coils until the temperature in the reactor was about 70° C. After this, propylene was flushed through the reactor for about 15 minutes. The temperature was lowered to ambient and one liter of Esso chemical grade hexane, which had been dried over 4A molecular sieve and stored over sodium, was added to the reactor. As the temperature was raised to 35° C., propylene was fed to the reactor through a 4A molecular sieve column until a pressure of 42.5 inches of mercury was reached. The pressure was raised to 61.0 inches of mercury with ethylene fed through a 4A molecular sieve column and 1.67 millimols (0.23 cc.) of 5-ethylidene-2-norbornone and 1.3 cc. of 1.5 molar ethylaluminum sesquichloride were added.

After addition of the above monomers, the catalyst components, i.e., 0.172 molar methylaluminum sesquichloride and 0.014 molar vanadium oxytrichloride, at a 12 to 1 aluminum to vanadium ratio in the absence of a promoter, or 15 to 1 aluminum to vanadium ratio with the use of a promoter, were fed into the reactor at a constant rate until a drop in the pressure in the reactor was noted. The molar feed rate of promotor to vanadium catalyst was varied between 0 and 3.8, and it was fed to the reactor in the form of a solution in the solvent. At this time, more of the gaseous monomers were fed into the reactor through calibrated rotometers at a rate of 1482 cc./minute, of which 694 cc. were ethylene and 788 cc. were propylene. The 5-ethylidene-2-norbornene was added as a 0.20 molar solution in hexane, at a rate of 1.31 cc./minute which provided about 2.3 weight percent to be incorporated into the polymer. The suppressor (aniline or pyridine) was fed in with either the third monomer or promoter solution at a feed rate concentration of 1.1 to 2 times that of the vanadium concentration. The polymerization was controlled by the catalyst pumps which added catalyst on demand as the pressure increased, thus maintaining the 61 inches of mercury pressure throughout the run. When the solvent in the reactor contained approximately 6% polymer, fresh solvent containing 16 cc. of ethylene per cc. of solvent was fed into the reactor at the rate of 27.2 cc./minute, and the polymer cement was taken off continuously. About 84.5 g. of polymer per hour was produced.

At this time, the ethylene and propylene feeds were adjusted to 327 cc./minute and 1698 cc./minute, respectively, to compensate for the unreacted monomers removed with the cement. The feed rate for the solution of 5-ethylidene-2-norbornene was adjusted to 1.57 cc./minute.

The cement as removed from the reactor was fed into a Waring Blendor containing water where it was intimately mixed. The cement was then washed three times with equal volumes of water. About 1 part per 100 of rubber of a stabilizer SDAO, a product of Naugatuck Chemical Company, or 0.1 part per 100 of rubber of Irganox 1010, a product of Geigy Chemical Co., was added to the washed cement and it was fed under nitrogen pressure into a T-joint at the bottom of a 4-liter container filled with hot circulating water. The other end of the T was connected to a steam line and steam was admitted at a rate to superheat the rubber cement. The solvent and unreacted monomers were mostly removed by this procedure. The rubber crumb was collected on a screen, washed, chopped up in a Waring Blendor, and dried in an oven at 90° C. to remove any remaining solvent and water. The rubbery polymer had a mole ratio of chemically bound ethylene to propylene of 60:40 as determined by infrared analysis, using the 720 cm.$^{-1}$ absorbance for ethylene and the 968 cm.$^{-1}$ absorbance for propylene.

The polymer had a reduced specific viscosity (RSV) (0.1% in Decalin at 135° C.) in the range of 2.2 to 3.4 as shown in Table 1, and the calculated or theoretical unsaturation expressed in C=C/1000 carbon atoms was 2.7. A 0.1% solution of the polymer in Decalin, e.g., 0.1 g. of polymer dissolved in 100 cc. of Decalin, was used when measuring the reduced specific viscosity.

Curing of the dried rubber was effected by compounding in a Brabender Plasti-Corder, on a weight basis, 100 parts or rubber, 80 parts of semi-reinforcing carbon black, 55 parts of naphthenic rubber processing oil, 5 parts of zinc oxide, 1 part of stearic acid, 0.75 parts of mercaptobenzothiazole, 1.5 parts of tetramethylthiuram sulfide, and 1.5 parts of sulfur. Curing was for 30 minutes at 150° C. The properties of the cured rubber were determined by standard ASTM methods D412–62T, D–1646–63 and D395–61–B. The hardness was determined on a Shore A durometer. Heat rise (ΔT° F.) was by the Goodrich method. Dispersion was a visual rating of the compounded stock. The slope of the cure curve was determined on a Monsanto rheometer.

The data thus obtained are recorded below in Table I.

Polymerization Run No. 1 was made with the suppressor pyridine in the absence of a promoter. The mileage was only 171.

As the promoter HCA was increased in amount, the catalyst efficiency (mileage/RSV) was enhanced due to an increase in mileage rather than to a reduction in polymer molecular weight. Substituting aniline for pyridine in the promoted system resulted in a further marked improvement in the catalyst efficiency. At the same level of aniline, increasing the level of the promoter HCA resulted in an improvement in the catalyst efficiency.

Use of the promoter PCCC resulted in increased mileage and lowering of polymer molecular weight, and the overall catalyst efficiency was improved substantially. The degree of promotion by TCAA is less than that brought about by either HCA or PCCC but it is still very effective. Use of a mixture of the promoters HCA and PCCC had an additive effect on promotion, while a mixture of the promoters HCA and TCAA had a synergistic effect on promotion.

ene was fed at the rate of 55.7 cc./minute and the polymer solution was withdrawn continuously. About 169 grams of polymer per hour was produced. At this time, the ethylene and propylene feeds were adjusted to 470 cc./minute and 2911 cc./minute respectively to compensate for the unreacted monomers removed with the polymer solution.

The polymer was recovered from the solvent and tested as in Example I. The polymer contained 57 mol percent of ethylene, the RSV was 1.79, and the unsaturation level was 2.7 C=C/1000 carbon atoms.

The polymer was compounded as in Example I, cured for 25 minutes at 320° F., and the cured rubber was tested following the standard ASTM methods of Example I. The Mooney viscosity ($ML_8$) was 25, the elongation was 520%, the 300% modulus was 1175 lbs./sq. in., the tensile strength was 2375 lbs./sq. in., the heat rise by the Goodrich method ($\Delta T$) was 79° F., the hardness (Shore A) was 61, and the cure rate was 5.4.

EXAMPLE III

This example illustrates a further series of runs for

TABLE I

| Run number | Molar ratio, promoter/suppressor | Catalyst, mileage/RSV | Dispersion | 300% modulus | Tensile (p.s.i.) | Hardness | $\Delta T$ (° F.) |
|---|---|---|---|---|---|---|---|
| 1 | 0/2 pyridine | 171/2.90=59 | Very good | 1,250 | 3,250 | 61 | 68 |
| 2 | 3.4 HCA/2 pyridine | 267/3.00=89 |  | 1,050 | 3,050 | 59 |  |
| 3 | 3.6 HCA/2 aniline | 312/2.79=112 | Good | 975 | 3,075 | 61 | 76 |
| 4 | 1.0 HCA/2 aniline | 324/3.25=100 |  | 1,200 | 3,275 | 58 | 72 |
| 5 | 3.7 PCCC/2 pyridine | 178/2.40=74 |  | 1,200 | 2,650 | 64 | 82 |
| 6 | 3.8 PCCC/2 aniline | 195/2.27=86 |  | 875 | 2,800 | 59 | 86 |
| 7 | 3.5 PCCC/2 aniline | 188/2.17=87 |  | 950 | 2,626 | 61 | 83 |
| 8 | 2.0 TCAA/1.1 aniline | 236/3.0=76 |  | 1,350 | 2,900 | 62 | 70 |
| 9 | 1.0 HCA plus TCAA/2.0 aniline | 331/2.84=117 |  | 1,250 | 2,825 | 62 | 71 |
| 10 | 1.0 HCA plus 1 PCCC/2.0 aniline. | 179/2.17=83 | Good | 1,100 | 2,850 | 65 | 73 |

NOTE.—HCA=Hexachloroacetone; PCCC=perchlorocrotonyl chloride; TCAA=trichloroacetanilide; Mileage=grams polymer millimols of vanadium in catalyst.

EXAMPLE II

The general procedure of Example I was followed except as noted below.

The reaction vessel was a one-gallon Sutherland reactor equipped as in Example I. As the temperature was raised to 40° C., propylene was fed through the molecular sieve column until a pressure of 43.1 inches of mercury was reached, and then the pressure was raised to 61 inches of mercury by feeding ethylene therein. Thereafter 3.06 millimols of 5-ethylidene-2-norbornene, 40 microliters of aniline, and 2.6 cc. of 1.5 M ethylaluminum sesquichloride were added.

The catalyst components, i.e., 0.313 molar ethyl aluminum sesquichloride and 0.023 molar vanadium oxytrichloride in amounts to provide a 16 to 1 aluminum to vanadium molar ratio and a 0.069 molar butyl perchlorocrotonate solution containing 2.1 cc. of aniline, were fed into the reactor until a pressure drop was noted. Additional ethylene and propylene were fed continuously into the reactor at rates of 1303 cc. and 1264 cc., respectively, per minute. Additional 5-ethylidene-2-norbornene was added as a 0.20 molar solution in hexane at the rate of 2.71 cc./minute to provide about 2.3 weight percent for incorporation in the polymer. When the solution contained 6% by weight of polymer, solvent containing ethylthe preparation of terpolymers from a monomeric mixture composed of ethylene, propylene and 5-ethylidene-2-norbornene, in the presence of a catalyst system composed of (a) methyl aluminum sesquichloride (MASC) or ethyl aluminum sesquichloride (EASC), (b) a suppressor which was ammonia, pyridine or aniline, (c) a promoter which was hexachloroacetone (HCA), ethyl perchlorocrotonate (EPCC) or butyl perchlorocrotonate (BPCC), and (d) $VOCl_3$. The monomeric mixture contained 60 mols of ethylene for each 40 mols of propylene, and sufficient 5-ethylidene-2-norbornene to provide an unsaturation level in the terpolymer of 2.5–9.0 double bonds per 1000 carbon atoms. The polymerization temperature was 32–40° C.

The general procedure and conditions for preparing and testing the terpolymer were the same as in Example II, except as noted herein to the contrary.

The data thus obtained are recorded below in Table II.

EXAMPLE IV

This example illustrates a further series of runs following the general procedure of Example III, but using a catalyst system composed of ethyl aluminum sesquichloride (EASC), hexachloroacetone (HCA), pyridine or ammonia as a suppressor, and $VOCl_3$.

The data thus obtained are recorded below in Table III.

TABLE II

| Run number | Molar ratio of Al alkyl/promoter/suppressor/$VOCl_3$ | Reaction temperature (° C.) | Target C=C/$10^3$ C | RSV in Decalin at 135° C. | Raw ML-8 | Catalyst mileage, g. of polymer/mM. V | Catalyst. mileage/RSV |
|---|---|---|---|---|---|---|---|
| 1 | 15 MASC/0/2 aniline/1 | 35 | 2.5 | 2.93 | 102 | 117 | 40 |
| 2 | 15 MASC/2.0 HCA/2 aniline/1 | 35 | 2.5 | 2.90 | 100 | 310 | 100 |
| 3 | 15 MASC/3 EPCC/0/1 | 35 | 2.7 | 2.84 | 94 | 258 | 91 |
| 4 | 17 EASC/2HCA/2 pyridine/1 | 40 | 2.7 | 2.14 | 55 | 152 | 71 |
| 5 | 17 EASC/3 BPCC/2 pyridine/1 | 40 | 2.7 | 2.20 | 46 | 316 | 143 |
| 6 | 17 EASC/3 BPCC/2 aniline/1 | 40 | 2.7 | 1.79 | 25 | 225 | 125 |
| 7 | 16 EASC/2 HCA/3 pyridine/1 | 32 | 9.0 | 3.09 | 123 | 227 | 75 |
| 8 | 14 EASC/2.3 BPCC/3 pyridine/1 | 32 | 9.0 | 2.52 | 76 | 359 | 142 |
| 9 | 14 EASC/2.1 BPCC/3 $NH_3$/1 | 32 | 9.0 |  |  | 483 |  |

TABLE III

| Run number | Molar ratio of EASC/HCA/ suppressor/VOCl₃ | C=C/ 1,000 C | Mol percent C₂H₄ | RSV | Raw ML-8 | Mileage, g./mM. V | Mileage/ RSV | ML-8/ RSV |
|---|---|---|---|---|---|---|---|---|
| 1 | 17/2/2pyridine/1 | 2.5 | 56 | 2.14 | 55 | 152 | 71 | 26 |
| 2 | 17/2/1 NH₃/1 | 2.6 | 56 | 2.18 | 56 | 252 | 115 | 26 |
| 3 | 19/2.4/1 NH₃/1 | 2.5 | 58 | 2.46 | 65 | 213 | 87 | 26 |

EXAMPLE V

The general procedure of Example I was followed except as noted below.

The catalyst system is composed of ethyl aluminum sesquichloride (EASC)₅, butyl perchlorocrotonate, pyridine or ammonia as suppressor and VOCl₃. The catalyst components were fed to the reactor in appropriate concentrations needed to effect 103 mols Al per mole of VOCl₃ and 25 mols promoter per mol of VOCl₃. The suppressor was fed to the reactor in the amount required to maintain 1.2 millimoles per liter of solvent.

EXAMPLE VI

The general procedure of Example V was followed except as noted below.

The catalysts components were fed to the reactor at 9.5 mols aluminum per mol of VOCl₃ and 1.5 mols promoter per mol of VOCl₃.

EXAMPLE VII

The general procedure of Example V was followed as noted below.

The catalyst components were fed to the reactor at 155 mols aluminum per mol of VOCl₃ and 19 mols promoter per mol of VOCl₃. The suppressor was fed to the reactor in the amount required to maintain 22 millimoles per liter of solvent.

TABLE IV

Reaction conditions: 32° C., 32 p.s.i.', 60% C₂H₄, 9 C=C/10³ C

| Example: | Mols Al/ mols VOCl₃ | Mols promoter/mols VOCl₃ | Mols amine/l. |
|---|---|---|---|
| V | 103 | 25 | 1.2 |
| VI | 9.5 | 1.5 | 1.2 |
| VII | 155 | 19 | 2.2 |

It will be understood that changes may be made in the formulation and details of operation without departing from the spirit of the invention, especially as defined in the following claims.

I claim:

1. In a process for preparing a sulfur vulcanizable elastomer wherein a monomeric mixture containing ethylene, at least one alpha-monoolefin containing about 3–16 carbon atoms, and at least one ethylenically unsaturated monomer having a plurality of carbon-to-carbon double bonds is interpolymerized in solution in an organic solvent in the presence of a heavy catalyst metal-containing Ziegler polymerization catalyst to produce a solution of the sulfur vulcanizable elastomer and thereafter the elastomer is recovered from the organic solvent solution, the improvement which comprises polymerizing the monomeric mixture in the presence of a base dissolved in an amount within the range of 0.1–10 millimoles per liter and a halogenated organic compound present in an amount within the range of 1–30 moles per mole of heavy metal in the catalyst, said halogenated compound being selected from the group consisting of hexachloropropene and a compound having the general formula

wherein R₁ is selected from the group consisting of the completely halogenated derivatives of alkyl and alkenyl groups having 1–20 carbon atoms, and A is selected from the group consisting of (1) alkyl groups, alkenyl groups and carbocyclic groups having 1–20 carbon atoms, and the halogenated derivatives thereof,
(2) aryl groups having 6–20 carbon atoms and the halogenated derivatives thereof,
(3) aralkyl groups having 7–25 carbon atoms and the halogenated derivatives thereof,
(4) oxyalkyl and oxyalkenyl groups of the general formula —OR₂, wherein R₂ is selected from the group consisting of alkyl and alkenyl groups containing 1–20 carbon atoms and the halogenated derivatives thereof,
(5) halogen, and
(6) a group having the general formula

wherein R₃ and R₄ are selected from the group consisting of
(a) hydrogen,
(b) alkyl and alkenyl groups having 1–20 carbon atoms and the halogenated derivatives thereof,
(c) aryl groups having 6–20 carbon atoms and the halogenated derivatives thereof, and
(d) aralkyl groups having 7–25 carbon atoms and the halogenated derivatives thereof.

2. The process as claimed in claim 1 in which the base is present in an amount within the range of 0.1–4 millimoles per liter.

3. The process as claimed in claim 1 in which the halogenated organic compound is present in an amount within the range of 2–10 moles per mole of heavy metal of the catalyst.

4. The process of claim 1 wherein the base is selected from the group consisting of ammonia, pyridine, hydrazine, hydroxylamine and O-ethers thereof wherein the ether group contains 1–5 carbon atoms, quinoline, isoquinoline, polyamines, alkyl, cycloalkyl, and aryl substituted pyridines, hydrazines, hydroxylamines and O-ethers thereof, quinolines and isoquinolines wherein the alkyl groups contain about 1–8 carbon atoms, the cycloalkyl groups contain about 4–12 carbon atoms and the aryl groups contain about 6–12 carbon atoms, and the amines of the general formula

wherein R is a hydrogen and the two R''s are groups selected individually from the group consisting of hydrogen, alkyl, halogenoalkyl, and aminoalkyl groups containing about 1–8 carbon atoms, cycloalkyl, halogenocycloalkyl, and aminocycloalkyl groups containing about 4–12 carbon atoms, aryl, halogenoaryl and aminoaryl groups containing about 6–12 carbon atoms, and monovalent cyclic and bicyclic radicals containing 4–12 carbon atoms wherein the two R' groups are joined through an atom selected from the group consisting of carbon, nitrogen and oxygen to form a heterocyclic ring, and not more than one R' is hydrogen.

5. The process of claim 1 wherein the base is selected from the group consisting of ammonia, aniline, pyridine, and mixtures thereof.

6. The process of claim 1 wherein the halogenated organic compound is selected from the group consisting of hexachloroacetone, perchlorocrotonyl chloride, butyl perchlorocrotonate, ethyl perchlorocrotonate, trichloroacetanilide and mixtures thereof.

7. The process of claim 1 wherein the halogenated organic compound is hexachloroacetone, and the hexachloroacetone is present in an amount of 1–30 mols per mol of heavy catalyst metal.

8. The process of claim 1 wherein the halogenated organic compound is butyl perchlorocrotonate, and the butyl perchlorocrotonate is present in an amount of 1–30 mols per mol of heavy catalyst metal.

9. The process of claim 1 wherein the monomeric mixture contains ethylene, propylene and a polyunsaturated bridged-ring hydrocarbon containing at least one ethylenic double bond in one of the bridged rings, the elastomer has a mol ratio of chemically bound ethylene to propylene between 90:10 and 10:90 and has an effective unsaturation level of at least 2 carbon-to-carbon double bonds per 1000 carbon atoms, the base is selected from the group consisting of ammonia, aniline, pyridine, and mixtures thereof, and the halogenated organic compound is selected from the group consisting of hexachloroacetone, perchlorocrotonyl chloride, butyl perchlorocrotonate, ethyl perchlorocrotonate, trichloroacetanilide and mixtures thereof.

10. The process of claim 1 wherein the organic solvent is a hydrocarbon solvent and the bridged-ring hydrocarbon is selected from the group consisting of dicyclopentadiene, 5-methylene-2-norbornene, 5-ethylidene-2-norbornene, and 5-isopropylidene-2-norbornene.

11. The process of claim 1 wherein the base is ammonia.

12. The process of claim 1 wherein the halogenated organic compound is butyl perchlorocrotonate.

13. The process of claim 1 wherein the bridged-ring hydrocarbon is 5-ethylidene-2-norbornene.

14. The process as claimed in claim 1 in which the monomeric mixture is polymerized in the presence of a catalyst formed of a vanadium compound and an alkyl aluminum halide present in the ratio of 5–200 mols of aluminum per one mol of vanadium.

15. The process as claimed in claim 1 in which the monomeric mixture is polymerized in the presence of a catalyst formed of a vanadium compound and an alkyl aluminum halide present in the ratio of 15–60 mols aluminum per mole of vanadium.

16. The process as claimed in claim 1 in which the monomeric mixture is polymerized in the presence of a catalyst formed of vanadium oxytrichloride and an alkyl aluminum sequichloride in which the alkyl group of the alkyl aluminum sesquichloride contains 1–2 carbon atoms and in which the materials are present in the ratio within the range of 5–200 mols of aluminum per mol of vanadium.

17. The process of claim 1 wherein the monomeric mixture is polymerized in the presence of a catalyst prepared from vanadium oxytrichloride and an alkyl aluminum sesquichloride, the alkyl group of the alkyl aluminum sesquichloride contains 1–2 carbon atoms, the mol ratio of aluminum to vanadium is about 5–200, the mol ratio of chemically bound ethylene to propylene is between 70:30 and 55:45, the base is aniline, and the halogenated organic compound is hexachloroacetone.

18. The process of claim 17 wherein the elastomer has an effective unsaturation level of about 2–25 carbon-to-carbon double bonds per 1000 carbon atoms, the hexachloroacetone is present in an amount of 1–30 mols per mole of vanadium, the aniline is present in an amount of 0.1–10 millimols per liter vanadium, and the mol ratio of alkyl aluminum sesquichloride to vanadium oxytrichloride is such that the aluminum to vanadium mol ratio is 15:60.

19. The process of claim 1 wherein the monomeric mixture is polymerized in the presence of a catalyst prepared from vanadium oxytrichloride and an alkyl aluminum sesquichloride, the alkyl group of the alkyl aluminum sesquichloride contains 1–2 carbon atoms, the mol ratio of alkyl aluminum sesquichloride to vanadium oxytrichloride is such that the mol ratio of aluminum to vanadium is 15:60, the mol ratio of chemically bound ethylene to propylene is between 70:30 and 55:45, the base is ammonia, and the halogenated organic compound is butyl perchlorocrotonate.

20. The process of claim 19 wherein the elastomer has an effective unsaturation level of about 2–25 carbon-to-carbon double bonds per 1000 atoms, the ammonia is present in an amount of 0.1–10 millimoles per liter of solvent, the butyl perchlorocrotonate is present in an amount of 1–30 mols per mol of vanadium, and the mol ratio of alkyl aluminum sesquichloride to vanadium oxytrichloride is such that the mol ratio of aluminum to vanadium is 15:60.

21. In a process for preparing a sulfur vulcanizable elastomer wherein a monomeric mixture containing ethylene, at least one monoethylenically unsaturated monomer containing about 3–16 carbon atoms and at least one ethylenically unsaturated monomer having a plurality of carbon-to-carbon double bonds is interpolymerized in solution in an organic solvent in the presence of a Ziegler polymerization catalyst formed of a halide of a metal selected from the group consisting of groups IV$b$, V$b$, VI$b$ and VII$b$ of the Mendeléeff periodic chart of elements within an organic metallic compound selected from the group consisting of Groups I, II and III of the Mendeléeff periodic chart of elements and present in the ratio of 5–200 moles of the metallic component of the organo metallic compound per 1 mole of the metallic component of the metal halide to produce a solution of the sulfur vulcanizable elastomer, polymerizing the monomeric mixture in the presence of a base dissolved in the organic solvent in an amount within the range of 0.1–10 millimoles per liter and a halogenated organic compound present in an amount within the range of 1–30 mols per mol of heavy metallic component of the metal halide, said halogenated compound being selected from the group consisting of hexachloropropene and a compound having the general formula

wherein R$_1$ is selected from the group consisting of the completely halogenated derivatives of alkyl and alkenyl groups 1–20 carbon atoms, and A is selected from the group consisting of (1) alkyl groups, alkenyl groups and carboxylic groups having 1–20 carbon atoms and the halogenated derivatives thereof, (2) aryl groups having 6–20 carbon atoms and the halogenated derivatives thereof, (3) aralkyl groups having 7–25 carbon atoms and the halogenated derivatives thereof, (4) oxyalkyl and oxyalkenyl groups of the general formula —OR$_2$, wherein R$_2$ is selected from the group consisting of alkyl and alkenyl groups containing 1–20 carbon atoms and the halogenated derivatives thereof, (5) halogen, and (6) a group having the general formula

wherein R$_3$ and R$_4$ are selected from the group consisting of (a) hydrogen, (b) alkyl and alkenyl groups having 1–20 carbon atoms and the halogenated derivatives thereof, (c) aryl groups having 6–20 carbon atoms and the halogenated derivatives thereof, and (d) aralkyl groups having 7–25 carbon atoms and the halogenated derivatives thereof.

22. The process as claimed in claim 21 in which the mol ratio of the metallic component of the organo metallic compound to the metallic component of the heavy metal halide is within the range of 15–60:1.

23. The process as claimed in claim 21 in which the metallic component of the metal halide is vanadium and in which the metallic component of the organo metallic compound is aluminum and in which the aluminum to vanadium ratio is 5–200:1.

24. The process as claimed in claim 21 in which the metallic component of the metal halide is vanadium and in which the metallic component of the organo metallic compound is aluminum and in which the aluminum to vanadium ratio is 15–60:1.

25. In a process for preparing a sulfur vulcanizable elastomer wherein a monomeric mixture containing ethylene, at least one alpha-monoolefin containing about 3–16 carbon aotms, and at least one ethylenically unsaturated monomer having a plurality of carbon-to-carbon double bonds is interpolymerized in solution in an organic solvent in the presence of a heavy catalyst metal-containing Ziegler polymerization catalyst to produce a solution of the sulfur vulcanizable elastomer in which the catalytic system includes a halide of vanadium with an organo metallic compound of aluminum present in the ratio of 10–30 moles of aluminum to one mole of vanadium and thereafter the elastomer is recovered from the organic solvent solution, the improvement which comprises polymerizing the monomeric mixture in the presence in the organic solvent of an amine dissolved therein in an amount within the range of 0.1–10 millimoles per liter and a halogenated compound present in an amount within the range of 0.1–10 moles per mole of vanadium, said halogenated compound being selected from the group consisting of hexachloropropene and a compound having the general formula

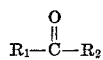

wherein $R_1$ is selected from the group consisting of the completely halogenated derivatives of alkyl and alkenyl groups having 1–20 carbon atoms, and $R_2$ is selected from the group consisting of
(1) alkyl and alkenyl groups having 1–20 carbon atoms and the halogenated derivatives thereof,
(2) aryl groups having 6–20 carbon atoms and the halogenated derivatives thereof,
(3) aralkyl groups having 7–25 carbon atoms and the halogenated derivatives thereof,
(4) halogen, and
(5) a group having the general formula

wherein $R_3$ and $R_4$ are selected from the group consisting of
(a) hydrogen,
(b) alkyl and alkenyl groups having 1–20 carbon atoms and halogenated derivatives thereof,
(c) aryl groups having 6–20 carbon atoms and the halogenated derivatives thereof, and
(d) aralkyl groups having 7–25 carbon atoms and the halogenated derivatives thereof.

26. The process of claim 1 wherein the amine is dissolved in the organic solvent in an amount of about 0.1–10 millimoles per liter and is selected from the group consisting of pyridine, hydrazine, quinoline, isoquinoline, alkyl, cycloalkyl, and aryl substituted pyridines, hydrazines, hydroxylamines and O-ethers thereof, quinolines and isoquinolines wherein the alkyl groups contain about 1–8 carbon atoms, the cycloalkyl groups contain about 4–12 carbon atoms and the aryl groups contain about 6–12 carbon atoms, and amines of the general formula

wherein R and R' are selected from the group consisting of hydrogen, alkyl and aminoalkyl groups containing about 1–8 carbon atoms, cycloalkyl and aminocycloalkyl groups containing about 4–12 carbon atoms, and aryl groups containing about 6–12 carbon atoms, and not more than two of R and R' are hydrogen.

27. The process of claim 26 wherein the amine is selected from the group consisting of aniline, pyridine, and mixtures thereof.

28. The process of claim 25 wherein the halogenated compound is selected from the group consisting of hexachloroacetone, perchlorocrotonyl chloride, trichloroacetanilide and mixtures thereof.

29. The process of claim 27 wherein the halogenated compound is hexachloroacetone, and the hexachloroacetone is present in an amount of 0.1–10 moles per mole of heavy catalyst metal.

30. The process of claim 25 wherein the monomeric mixture contains ethylene, propylene and a polyunsaturated bridged-ring hydrocarbon containing at least one ethylenic double bond in one of the bridged rings, the elastomer has a mole ratio of chemically bound ethylene to propylene between 90:10 and 10:90 and has an effective unsaturation level of at least 2 carbon-to-carbon double bonds per 1000 carbon atoms, the amine is selected from the group consisting of aniline and pyridine, and the halogenated compound is selected from the group consisting of hexachloroacetone, perchlorocrotonyl chloride, trichloroacetanilide and mixtures thereof.

31. The process of claim 30 wherein the bridged-ring hydrocarbon is selected from the group consisting of dicyclopentadiene, 5-methylene-2-norbornene, 5-ethylidene-2-norbornene, and 5-isopropylidene-2-norbornene.

32. The process of claim 31 wherein the bridged-ring hydrocarbon is 5-ethylidene-2-norbornene.

33. The process of claim 32 wherein the monomeric mixture is polymerized in the presence of a catalyst prepared from vanadium oxytrichloride and an alkylaluminum sesquichloride, the alkyl group of the alkylaluminum sesquichloride contains 1–2 carbon atoms, the mole ratio of alkylaluminum sesquichloride to vanadium oxytrichloride is about 10–30, the mole ratio of chemically bound ethylene to propylene is between 70:30 and 55:45, the amine is aniline, and the halogenated compound is hexachloroacetone.

34. The process of claim 33 wherein the elastomer has an effective unsaturation level of about 2–25 carbon-to-carbon double bonds per 1000 carbon atoms, the aniline is present in an amount of 1–30 moles per mole of vanadium, the hexachloroacetone is present in an amount of 0.1–10 moles per mole of vanadium, and the mole ratio of alkylaluminum sesquichloride to vanadium oxytrichloride is 15–20.

35. A process for preparing a sulfur vulcanizable elastomer wherein a monomeric mixture containing ethylene, at least one alpha-monoolefin containing from 3–16 carbon atoms, and at least one ethylenically unsaturated monomer having a plurality of carbon-to-carbon double bonds is interpolymerized in solution in an organic solvent in the presence of a Ziegler polymerization catalyst containing a halide of a metal selected from the group consisting of Groups IVb, Vb, VIb and VIIb of the Mendeléeff periodic chart of elements with an organic compound of a metal selected from the group consisting of Groups I, II and III of the Mendeléeff periodic chart of elements and present in the ratio of 10–30 moles of the metallic component in the organo metallic compound to one mole of the metallic component in the heavy metal halide, the improvement which comprises polymerizing the monomeric mixture in the presence of an amine dissolved in the organic solvent in an amount within the range of 0.1–1 millimoles per liter and a halogenated compound present in an amount within the range of 0.1–10 moles per mole of the heavy metallic component in the metal halide, said halogenated compound being selected from the group consisting of hexachloropropene and a compound having the general formula

wherein $R_1$ is selected from the group consisting of the completely halogenated derivatives of alkyl and alkenyl groups having 1–20 carbon atoms, and $R_2$ is selected from the group consisting of (1) alkyl and alkenyl groups having 1–20 carbon atoms and the halogenated derivatives thereof,
(2) aryl groups having 6–20 carbon atoms and the halogenated derivatives thereof,
(3) aralkyl groups having 7–25 carbon atoms and the halogenated derivatives thereof,
(4) halogen, and
(5) a group having the general formula

wherein $R_3$ and $R_4$ are selected from the group consisting of
(a) hydrogen,
(b) alkyl and alkenyl groups having 1–20 carbon atoms and the halogenated derivatives thereof,
(c) aryl groups having 6–20 carbon atoms and the halogenated derivatives thereof, and
(d) aralkyl groups having 7–25 carbon atoms and the halogenated derivatives thereof.

References Cited

UNITED STATES PATENTS 3,380,981    4/1968    Miller _____ 260—93.7

JOSEPH L. SCHOFER, Primary Examiner

R. S. BENJAMIN, Assistant Examiner

U.S. Cl. X.R.

252—429, 431; 260—79.5

UNITED STATES PATENT OFFICE
CERTIFICATE OF CORRECTION

Patent No. 3,645,993            Dated    February 29, 1972

Inventor(s)    Ronald H. Sunseri

It is certified that error appears in the above-identified patent and that said Letters Patent are hereby corrected as shown below:

column 11, line 52, cancel "alpha-monoolefin" and substitute --- monoethylenically unsaturated monomer ---;

column 14, line 45, before"1-20" insert --- having ---;

column 15, line 15, cancel "alpha-monoolefin" and substitute --- monoethylenically unsaturated monomer ---;

column 15, line 53, correct the formula to read:

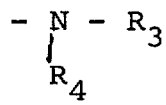

column 16, line 56, cancel "alpha-monoolefin" and substitute --- monoethylenically unsaturated monomer ---.

Signed and sealed this 10th day of October 1972.

(SEAL)
Attest:

EDWARD M. FLETCHER, JR.    ROBERT GOTTSCHALK
Attesting Officer    Commissioner of Patents